US009203694B2

(12) United States Patent
Rajamani et al.

(10) Patent No.: US 9,203,694 B2
(45) Date of Patent: Dec. 1, 2015

(54) NETWORK ASSISTED UPNP REMOTE ACCESS

(71) Applicant: Telefonaktiebolaget L M Ericsson (publ), Stockholm (SE)

(72) Inventors: Srikar Rajamani, Bangalore (IN); Srinivas Kadaba, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 123 days.

(21) Appl. No.: 13/837,406

(22) Filed: Mar. 15, 2013

(65) Prior Publication Data

US 2014/0280938 A1 Sep. 18, 2014

(51) Int. Cl.
| | |
|---|---|
| H04L 12/24 | (2006.01) |
| H04L 29/08 | (2006.01) |
| H04L 12/28 | (2006.01) |
| H04L 12/46 | (2006.01) |

(52) U.S. Cl.
CPC .......... *H04L 41/0809* (2013.01); *H04L 12/283* (2013.01); *H04L 12/2854* (2013.01); *H04L 12/4633* (2013.01); *H04L 67/16* (2013.01)

(58) Field of Classification Search
CPC ..... H04L 12/12; H04L 12/283; H04L 12/287; H04L 12/4641; H04L 12/2809; H04L 61/203; H04L 61/2528; H04L 67/40; H04L 41/0809
USPC .......... 709/203, 219, 220, 223, 224, 225, 227
See application file for complete search history.

(56) References Cited

U.S. PATENT DOCUMENTS

| | | | |
|---|---|---|---|
| 5,956,323 | A | 9/1999 | Bowie |
| 6,631,416 | B2 | 10/2003 | Bendinelli et al. |
| 7,675,923 | B2 | 3/2010 | Rossi et al. |
| 7,729,365 | B2 | 6/2010 | Motegi et al. |
| 7,801,039 | B2 | 9/2010 | Monette et al. |
| 7,802,286 | B2 | 9/2010 | Brooks et al. |
| 7,830,821 | B2 | 11/2010 | Lin et al. |
| 7,969,975 | B2 | 6/2011 | Jiang et al. |

(Continued)

FOREIGN PATENT DOCUMENTS

| | | |
|---|---|---|
| EP | 1562390 A1 | 10/2005 |
| WO | 2009030282 A1 | 12/2009 |

OTHER PUBLICATIONS

"Remote Access Architecture: 1", For UPnP, Version 1.0; Status: Standardized DCP; Sep. 30, 2009; 30 pages.

(Continued)

*Primary Examiner* — Ramy M Osman
(74) *Attorney, Agent, or Firm* — Nicholson De Vos Webster & Elliott, LLP

(57) ABSTRACT

A network-assisted remote access system enables a user to remotely access a home Universal Plug-and-Play (UPnP) network from a visited UPnP network. A controller device coupled to a network edge device is operated by a network service provider. When the controller device receives a request from a roaming user to access her home UPnP network, the controller device confirms with a home network edge device that the user is authorized to access the home UPnP network. The controller device then instantiates a layer-2 connection specific for the user between the user device and the home edge device. The controller device provides the user device access to the home UPnP network via the layer-2 connection.

21 Claims, 6 Drawing Sheets

(56) References Cited

U.S. PATENT DOCUMENTS

| | | | |
|---|---|---|---|
| 8,024,429 B2* | 9/2011 | Cagenius | 709/219 |
| 8,045,570 B2 | 10/2011 | Allan et al. | |
| 8,151,320 B2* | 4/2012 | Ueno | 726/3 |
| 8,190,726 B2* | 5/2012 | Han et al. | 709/223 |
| 8,230,050 B1 | 7/2012 | Brandwine et al. | |
| 8,326,873 B2 | 12/2012 | Ellis et al. | |
| 8,345,564 B2* | 1/2013 | Cho | H04L 41/0809 370/252 |
| 8,379,533 B2* | 2/2013 | Cho | H04L 41/0809 370/252 |
| 8,402,122 B2* | 3/2013 | Cho et al. | 709/220 |
| 8,578,003 B2 | 11/2013 | Brandwine et al. | |
| 8,588,194 B2 | 11/2013 | Chen | |
| 8,626,846 B2 | 1/2014 | Coppens et al. | |
| 8,645,577 B2 | 2/2014 | Maeng et al. | |
| 8,812,670 B2 | 8/2014 | Haddad et al. | |
| 2004/0117339 A1 | 6/2004 | Thubert et al. | |
| 2004/0148439 A1 | 7/2004 | Harvey et al. | |
| 2005/0020265 A1 | 1/2005 | Funabiki et al. | |
| 2005/0086371 A1 | 4/2005 | Jung | |
| 2005/0114496 A1* | 5/2005 | Fang et al. | 709/224 |
| 2005/0132061 A1 | 6/2005 | T'Joens et al. | |
| 2005/0159149 A1 | 7/2005 | Wen et al. | |
| 2005/0185607 A1 | 8/2005 | Svensson et al. | |
| 2006/0120386 A1 | 6/2006 | Rossi et al. | |
| 2006/0184645 A1 | 8/2006 | Monette et al. | |
| 2006/0224701 A1 | 10/2006 | Camp, Jr. | |
| 2007/0004436 A1* | 1/2007 | Stirbu | 455/503 |
| 2007/0064653 A1 | 3/2007 | Jang et al. | |
| 2007/0160050 A1 | 7/2007 | Wang | |
| 2007/0201508 A1 | 8/2007 | Blackford et al. | |
| 2007/0217436 A1 | 9/2007 | Markley et al. | |
| 2008/0013554 A1 | 1/2008 | Motegi et al. | |
| 2008/0181240 A1 | 7/2008 | Jiang et al. | |
| 2008/0192695 A1 | 8/2008 | Krishnan et al. | |
| 2008/0256458 A1 | 10/2008 | Aldred et al. | |
| 2008/0267215 A1 | 10/2008 | Blackburn et al. | |
| 2008/0316974 A1 | 12/2008 | Krishnan et al. | |
| 2009/0047016 A1 | 2/2009 | Bernard et al. | |
| 2009/0047945 A1 | 2/2009 | Zhang et al. | |
| 2009/0055900 A1 | 2/2009 | Gopalasetty et al. | |
| 2009/0092095 A1* | 4/2009 | Hata et al. | 370/331 |
| 2009/0135829 A1 | 5/2009 | Zheng | |
| 2009/0199040 A1 | 8/2009 | Liu et al. | |
| 2009/0303926 A1* | 12/2009 | Den Hartog et al. | 370/328 |
| 2010/0080238 A1 | 4/2010 | Allan et al. | |
| 2010/0186079 A1 | 7/2010 | Nice et al. | |
| 2010/0191829 A1* | 7/2010 | Cagenius | 709/219 |
| 2010/0309894 A1* | 12/2010 | Csaszar et al. | 370/338 |
| 2011/0040858 A1 | 2/2011 | Gum | |
| 2011/0235549 A1 | 9/2011 | Ahlers et al. | |
| 2012/0052857 A1 | 3/2012 | Kumar et al. | |
| 2012/0087235 A1 | 4/2012 | Smith et al. | |
| 2012/0189016 A1 | 7/2012 | Bakker et al. | |
| 2012/0311108 A1 | 12/2012 | Brandwine et al. | |
| 2012/0314617 A1 | 12/2012 | Erichsen et al. | |
| 2012/0320736 A1 | 12/2012 | Hillier et al. | |
| 2013/0091279 A1 | 4/2013 | Haddad et al. | |
| 2014/0280938 A1* | 9/2014 | Kadaba | H04L 41/0809 709/225 |
| 2014/0286348 A1 | 9/2014 | Haddad et al. | |

OTHER PUBLICATIONS

U.S. Appl. No. 13/271,056, Non-Final Office Action, mailed Mar. 11, 2013, 16 pages.
U.S. Appl. No. 13/271,056, Final Office Action, mailed Aug. 22, 2013, 17 pages.
U.S. Appl. No. 13/271,056, Non-Final Office Action, mailed Jan. 27, 2014, 17 pages.
U.S. Appl. No. 13/271,056, Notice of Allowance, mailed May 13, 2014, 18 pages.
U.S. Appl. No. 14/293,803, Non-Final Office Action, mailed Apr. 22, 2015, 20 pages.
Troan, et al., RFC 3633-!Pv6 Prefix Options for Dynamic Host Configuration Protocol (DHCP) version 6, Dec. 2003, 19 pages.
U.S. Appl. No. 14/293,803, Notice of Allowance, mailed Jul. 31, 2015, 8 pages.

* cited by examiner

NETWORK ASSISTED UPNP REMOTE ACCESS

TECHNICAL FIELD

Embodiments of the invention relate to communication network management; and more specifically, to the remote access to a UPnP network.

BACKGROUND

UPnP technology was envisioned for deployment in a protected local area network (LAN). The technology allows for devices to connect to a shared LAN, discover each other's capabilities and control the functions in another device.

Since its inception, the UPnP standard has been expanded to support remote access through the UPnP Remote Access Architecture (see, Remote Access Architecture: 1, For UPnP Version 1.0, Sep. 30, 2009). This standard describes various components and mechanisms that enable remote access to a UPnP domain, and allows a device which is not connected to the same LAN as the other devices to be added to the UPnP domain for seamless integration with the other devices.

According to the UPnP Remote Access architecture, the interconnecting remote access servers are located within the UPnP network domains to which these servers enable access. For example, a UPnP remote access server can be configured in or alongside the residential gateway to enable connection into the home UPnP network. However, the configuration of the server can become considerably complex if the user has to work with firewalls and various network configurations. The complexity of such configuration is significantly exacerbated if two separate UPnP networks (e.g., two geographically separate homes) are to be connected.

The UPnP Remote Access architecture does not explicitly support firewall configuration, and expects the user to have the technical expertise to perform the configuration. In addition to being a complicated task for the average user, the existing approach can expose an average user to malicious attacks from the Internet, if the user inadvertently opens up the firewall. Additionally, a user is expected to know a publically routable IP address received from the network service provider, and provide the IP address for UPnP signaling to work. This is further complicated if the IP address is obtained dynamically and is not static, which is the most common scenario in residential service.

SUMMARY

Embodiments of the invention provide a method and a system that enable a user to remotely access a home UPnP network using a user device from a visited UPnP network. When the user roams into the visited UPnP network, a controller device provides the user access to a Wide Area Network (WAN) and to the user's home UPnP network. The controller device is coupled to a visited network edge device, which is operated by a visited network operator and controls access of the visited UPnP network from and to the WAN.

In one embodiment, the method of the controller device comprises receiving a request from the user device through a visited Customer Premise Equipment (CPE) to access the home UPnP network from the visited UPnP network. In response to the request, the controller device confirms with a home network edge device that the user is authorized to access the home UPnP network. The home network edge device is operated by a home network operator and controls access of the home UPnP network from and to the WAN. The controller device then instantiates a layer-2 connection specific for the user between the user device and the home edge device, where the layer-2 connection spans from the user device through the visited CPE, the visited network edge device and the WAN to reach the home network edge device. The controller device provides the user device access to the home UPnP network via the layer-2 connection.

In one embodiment, a network device functioning as the controller device includes one or more processors, and a network interface coupled to the one or more processors. The network interface is adapted to receive a request from the user device through a visited CPE to access the home UPnP network from the visited UPnP network. The one or more processors are adapted to perform the method described above.

In one embodiment, a method of the controller device is performed as described above, where the network edge device is a Broadband Network Gateway (BNG), the user device is a mobile device, and the CPE is a residential gateway.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
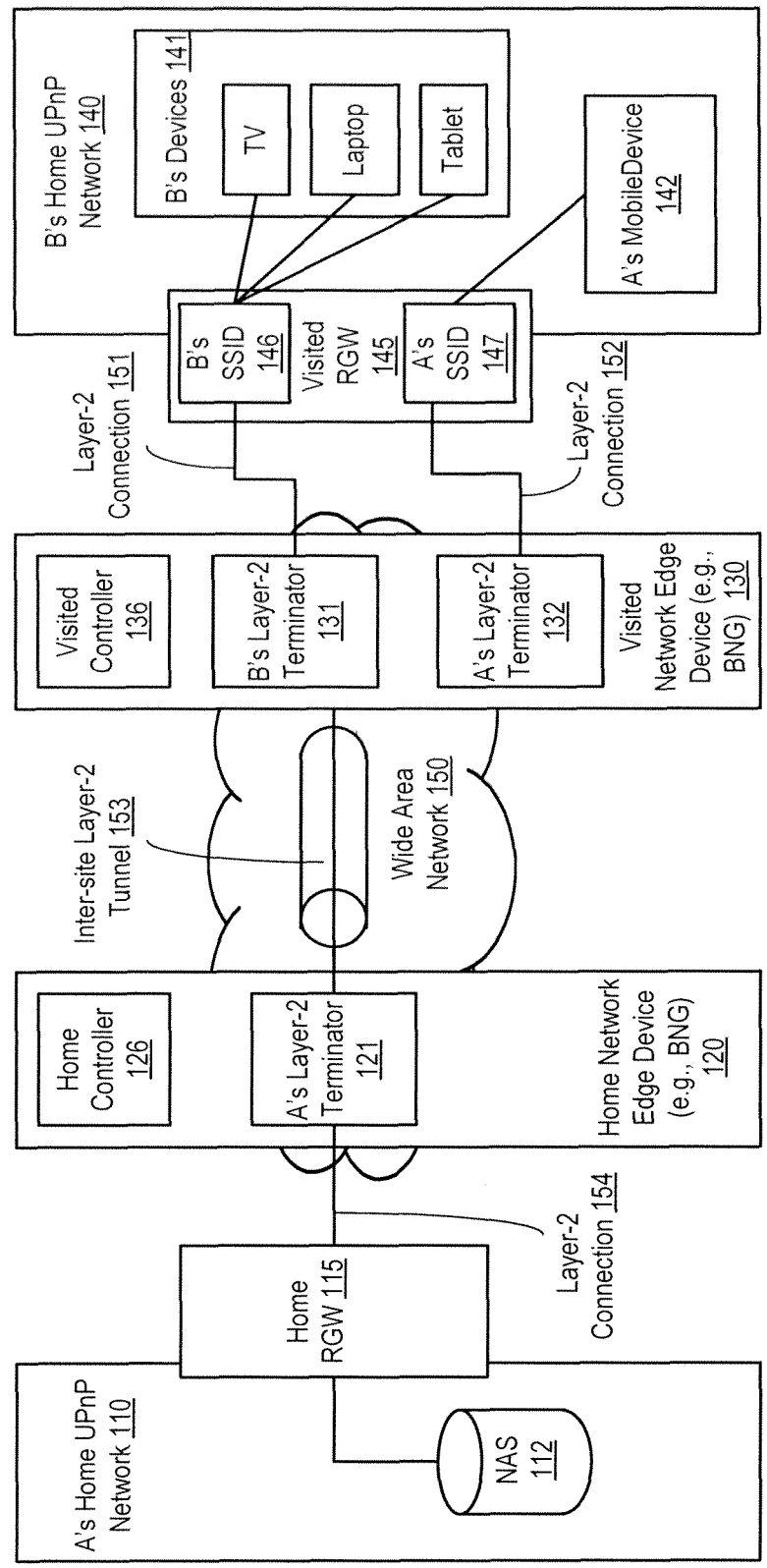
FIG. 1 illustrates an example of an environment in which an embodiment of the invention may operate.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a network assisted method and system that allow two separate UPnP networks to be seamlessly interconnected. The network assisted system moves the configuration task that is complex for users to the network service provider (also referred to as the "network operator"), who already manages complex network state on behalf of the user. The network assisted system enables new media service offerings for network service providers. Network service providers can leverage the mechanisms already deployed in mobile networks to offer roaming services to users. Standardized information may be exchanged among different service providers. The roaming services may be offered as a value-added service to users who wish to remotely accessing the UPnP service without the complex and largely error prone configuration task.

According to the network assisted method and system described herein, a user can access a remote UPnP network without having to perform complex configuration of a remote access server, firewall and Network Address Translation (NAT). Requiring a user to configure an NAT is natively at odds with a service like UPnP, and is limited in scalability due to the need to maintain packet-by-packet state in the core of the network.

According to embodiments of the invention, a method and a system are provided in which a network service provider offers remote access to UPnP as a service to users. According to embodiments of the invention, a user's home layer-2 network connection is extended from the user's home to the network service provider's access router, such as a Broadband Network Gateway (BNG) or a Broadband Remote Access Server (BRAS). The UPnP remote access service includes providing a UPnP remote access server and proxy instances to the users.

Further, a network service provider (also referred to as a "service provider" or a "network operator") may implement a mechanism for exchanging subscription policies and access privileges on behalf of its users with other service providers to enable access and determine tariffs for roaming. The service provider may choose to issue multiple IP addresses to the user, based on the user's profile and the nature of the application accessed by the user. To allow the user to access the remote UPnP service from a user's device, the service provider provides the user with software which can be installed on the user's device, allowing the user to indicate intent to remotely access his UPnP service. The service provider also has the ability to remotely manage functions on Customer Premise Equipment (CPE), which is a network device allowing broadband services to a home or an office (e.g., a user's residential gateway (RGW) or a gateway of a business establishment).

Using the network-assisted remote access, a roaming user can request the visited service provider for remote access to his home UPnP service. After verification of the user's credentials with the user's home service provider, the visited service provider instantiates network state in the network edge and the residential gateway from where the roaming user is requesting access.

In one embodiment, a visited service provider enables remote access for a roaming user by instantiating network state. Instantiating the network state includes but is not limited to the operations of: (1) Configuration of the residential gateway at the visited location to enable the roaming user to be uniquely identified by the visited network service provider, (2) Instantiation of a UPnP proxy server for the roaming user to bridge the remote users UPnP traffic with his home UPnP domain, and (3) Instantiation of a layer-2 tunnel between the roaming user's network device and the layer-2 access device in the user's network service edge that connects the users' home to the network. This layer-2 tunnel will be configured with an IP address in the range allocated to the user's home network.

FIG. 1 is a diagram illustrating an example network environment in which embodiments of the invention may operate. In this embodiment, a user A's home UPnP network 110 (also referred to as the "home network") is connected to a wide-area network 150 (e.g., the Internet). The network connection is via a CPE (e.g., a home RGW 115) and a home network edge device (e.g., a BNG 120). Although the terms "BNG" and "RGW" are used throughout the description, it is appreciated that other types of network edge devices and CPE, respectively, may also be used.

In one embodiment, the home RGW 115 carries layer-2 network traffic from the home network 110 to the home BNG 120. The home RGW 115 exposes an interface that allows the network operator to manage its functions remotely.

The home BNG 120 is capable of providing layer-2 and layer-3 services to user A. Within user A's home network 110, multiple user A's devices (also referred to as the "home devices") are locally interconnected via the UPnP protocol. One of such devices may be a network attached storage (NAS) 112, which stores user A's media contents. Each home device of user A is connected to the home BNG 120 via a layer-2 connection 154. The home BNG 120 provides a layer-2 terminator 121 to terminate the layer-2 connection 154 from user A's home UPnP network 110.

User A also has a mobile device 142 that has roamed from her home UPnP network 110 into user B's UPnP network 140 (also referred to as the "visited network"). The mobile device 142 is installed with an application or has a set of credentials embedded in the device 142 (such as a physical Subscriber Identity Module (SIM) card or a software-based SIM). The application or embedded credentials allow user A to authenticate to the visited network operator and to request remote access to her home UPnP services. Although an "application" is used in the examples of FIGS. 2 and 3 for invoking the network-assisted remote access services, it is appreciated that alternative forms of invocation, such as by the device 142 sending one or more credentials, may also be used.

Within user B's home UPnP network 140 are multiple user B's devices 141 (also referred to as the "visited devices"), which are locally interconnected via the UPnP protocol. Examples of user B's devices 141 include but are not limited to TV, computers, tablets, music players, mobile phones, etc. User B's devices 141 are assigned a credential (e.g., SSID 146) in the visited RGW 145. The user B's UPnP network 140 is connected to the wide-area network 150 (e.g., the Internet) via user B' RGW (visited RGW 145) and a visited network edge device (e.g., visited BNG 130). Each of user B's devices is connected to the visited BNG 130 via a layer-2 connection 151. The visited BNG 130 provides a layer-2 terminator 131 for user B's devices. The visited BNG 130 and the home BNG 120 may be operated by the same network operator or different network operators.

According to one embodiment of the invention, user A may access her home UPnP network 110 from a remote location via the wide area network 150 by simply invoking an application from user A's device. In one scenario, the remote location is user B's UPnP network 140. User A's device 142 is assigned a combination of network parameters (e.g., a Service Set Identifier (SSID) 147) and associated credentials (such as a password to securely join or log onto the network identified by the SSID) in the visited RGW 145. From user B's UPnP network 140, user A's device 142 can be connected to the visited BNG 130 via a layer-2 connection 152 dedicated to user A. The visited BNG 130 is connected to the home BNG 120 via a secure inter-site layer-2 tunnel 153, and the home BNG 120 is connected to the home RGW 115 via the layer-2 connection 154. Through the layer-2 connections 152, 153 and 154, user A's device 142 can remotely access her home devices from user B's UPnP network 140.

In one embodiment, these layer-2 connections are established under the control of network controllers located in or coupled to the home BNG 120 and the visited BNG 130. In one embodiment, a home controller 126 and a visited controller 136 are co-located with the home BNG 120 and the visited BNG 130, respectively, and are operated by the respective network operators. The controllers 126 and 136 may be hardware, software, firmware, of a combination thereof. In one embodiment, each controller 126 and 136 is a controller device (e.g., a computer) coupled to their respective BNGs 120 and 130. The controllers 126 and 136 may be part of the respective BNGs 120 and 130, or may be external to the BNGs and coupled to the BNGs. The controllers 126 and 136 are capable of accepting requests from a roaming user and instantiating network states for the user, thus enabling the user to remotely access his/her home UPnP services.

Figure 2:
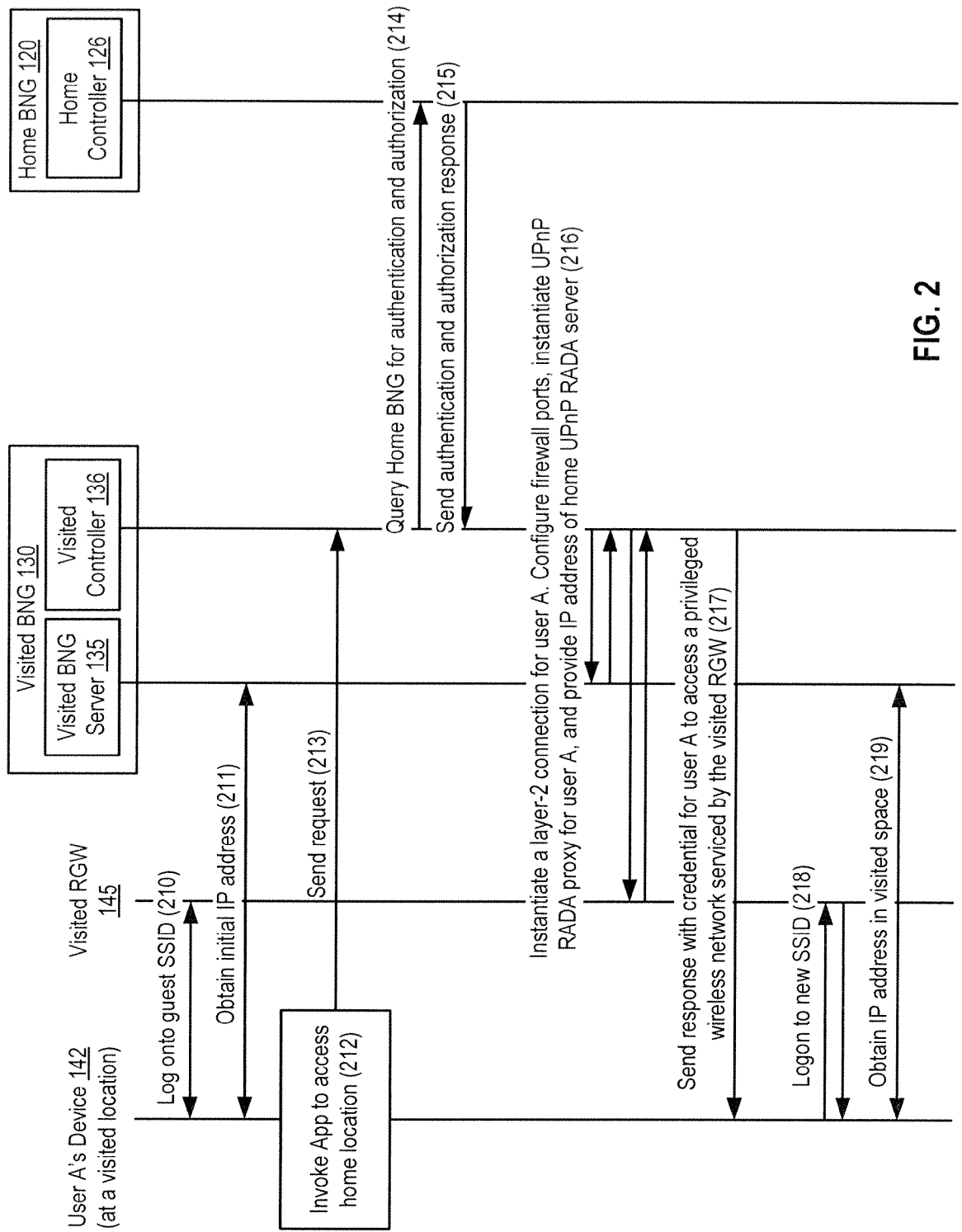
FIG. 2 is a diagram illustrating the message exchanges for instantiating network state for remote access according to one embodiment.

FIG. 2 is a diagram illustrating the message exchanges among user A's device 142, the visited RGW 145, the visited BNG 130 and the home BNG 120, according to one embodiment of the invention. The message exchanges enable the instantiation of a privileged layer-2 connection in the visited network for the roaming user (user A), including the authentication and authorization operations.

In one embodiment, when user A roams into the visited network 140, user A's device 142 connects to a guest wireless network. This wireless network does not offer complete connectivity to user A's device 142; e.g., it may only offer local link connectivity that allows user A's device 142 to communicate with the visited BNG 130.

To connect to a guest wireless network, user A's device 142 sends a request to the visited RGW 145 to log onto (210) a guest SSID. User A's device 142 also obtains (211) an initial Internet Protocol (IP) address from a visited BNG server 135, which is a service providing entity residing in the visited BNG 130. At this point, user A's device 142 can access user B's local networks but may not have an Internet connection.

When user A's device 142 invokes (212) an application to instantiate a service at the visited location (e.g., user B's home), the application sends (213) an authentication request message to the visited controller 136 via the visited BNG server 135. The message contains, among other things: user A's credentials (e.g., user A's ID), and information of user A's home network (e.g., the ID of the home BNG 120).

If the visited network service provider supports roaming users, the message is consumed, and the visited controller 136 requests user A's home network service provider for roaming privileges of user A. In one embodiment, the visited controller 136 queries (214) the home BNG 120, or an authentication, authorization and accounting (AAA) server coupled to the home BNG 120, for authentication and authorization to access the home UPnP network 110.

If user A is allowed roaming (according to a service agreement between user A and the home network service provider), the home BNG 120 will send (215) a response authenticating and authorizing user A's access. In response to such a response from the home BNG 120, the visited controller 136 instantiates (216) a new layer-2 connection (i.e., the layer-2 connection 152 of FIG. 1) to user A's device 142 through the visited RGW 145, and securely communicates the credentials for accessing a privileged wireless network to user A's device 142. For example, the instantiation of a new layer-2 connection may involve creation of a privileged wireless network (e.g. wireless local area network (WLAN) SSID) in the visited RGW 145. Further, the privileged wireless network is also associated with a unique layer-2 connection (e.g., a virtual local area network (VLAN)) instantiated for user A between the visited RGW 145 and the visited RNG 130, so that the traffic belonging to user A can be uniquely identified by the visited BNG 130.

In addition to instantiation of the privileged level-2 connection for user A, the visited controller 136 also configures (216) firewall ports in the visited BNG 130, instantiates a UPnP Remote Access Discovery Agent (RADA) proxy for user A (also referred to as "user A's UPnP proxy"), and provides an IP address of the home UPnP server. The visited controller 136 then sends (217) a response to user A's device 142 with a new SSID (e.g., the SSID 147 of FIG. 1), password (or passphrase), security mode, and, in some embodiments, Point-to-Point Protocol (PPP) information, to allow the device 142 to access a privileged wireless network serviced by the visited RGW 145. This response is forwarded by the visited BNG 130 and the visited RGW 145 to user A's device 142.

Upon receipt of the credentials, user A's device 142 connects to the new wireless network and accesses the wireless network. User A's device then uses the new SSID to log on (218) to a new wireless network provided by the visited RGW 145, and obtains (219) an IP address in the visited space; that is, from the address space controlled by the visited BNG 130. The visited network edge assigns an IP address from the visited network service provider's address range.

At this point, the network state necessary for user A to access the home UPnP network 110 has been setup. The network can associate the traffic with the roaming user for billing and other purposes, such as Internet access through the visited network. User A can use her device 142 to connect to any of her home devices as if user A's device 142 were physically present in the home UPnP network 110.

The following description provides more specific details about the instantiation of network state illustrated in FIG. 2. In one embodiment, when the roaming user (user A) wishes to access her home UPnP network remotely 110, she triggers a message to the visited controller 136. This can be accomplished, for instance, by a smartphone, tablet, or any portable device application provided by user A's network service provider. The visited controller 136, after confirmation of the user's credentials for remote UPnP service, instantiates relevant network state for a layer-2 tunnel (e.g., the Layer2 Tunneling Protocol (L2TP)) with appropriate L2TP Access Concentrator (LAC)/L2TP Network Server (LNS) configuration. In one embodiment, the layer-2 tunnel is stateless as far as the core of the network is concerned so that any UPnP messages pass through unmodified. For example, PPP over L2TP, which is widely deployed today, or location based addressing (LISP) in IPv6 serves the purpose adequately. Although PPP is used as an example of the tunneling mechanism in the description, it is appreciated that other network protocols may also be used.

In one embodiment, user A's home BNG 120 performs the role of the LNS, and terminate the PPP session at the port which connects to user A's home UPnP network 110 at layer-2. The PPP end point in user A's device 142 is assigned an IP address from the user's home network pool. At this time, user A is dual-homed. Since the PPP tunnel provides layer-2 connectivity between user A's device 142 and user A's home UPnP network 110, the PPP tunnel can transport UPnP multicast traffic between user A's home UPnP network 110 and user A's device 142.

In typical scenarios, the link local multicast used by UPnP may not be transported over WAN links such as PPP. In these scenarios, the network operator can deploy a UPnP server which listens to all UPnP messages from the user's home network (layer-2) and bridges it to a UPnP proxy which is instantiated at the user's visited network controller. Since the decision on using the UPnP server/proxy is based on a combination of hardware and software infrastructure of the network edge, and does not involve any configuration by the user, the deployment can be completely hidden from the end user.

In one scenario, user A may want to share her media contents stored in the NAS 112 (in user A's home UPnP network 110) with user B while visiting user B's home. For example, the media contents may be a video and user A may want to display the video on user B's TV. The UPnP remote access mechanism describe herein not only allows user A's device 142 to access other home devices in user A's home UPnP network, but also allow user B's device 141 to access user A's home devices under the direction of user A. User A can invoke an application on her device 142, selects a visited device from a list of user B's devices 141, and selects a home device in the home UPnP network 110. The controllers 126, 136 and the dynamically instantiated servers and proxies in the home BNG 120 and the visited BNG 130 handle the setup of the network states and network protection (e.g., authentication and firewall) for user A.

After a layer-2 connection to the home BNG 120 is set up, user A can receive Internet services according to the service agreements that she entered with her network operator. That is, if user A is provided with a high-bandwidth access in her the home UPnP network 110, she will continue to receive the same level of service while roaming into user B's home (assuming that there is adequate bandwidth to user B's home to accommodate user A's service-agreed bandwidth). The same level of service is offered to user A even when user A is using user B's TV to display her media contents, and even if user B has a lower-tiered service level than user A.

Figure 3:
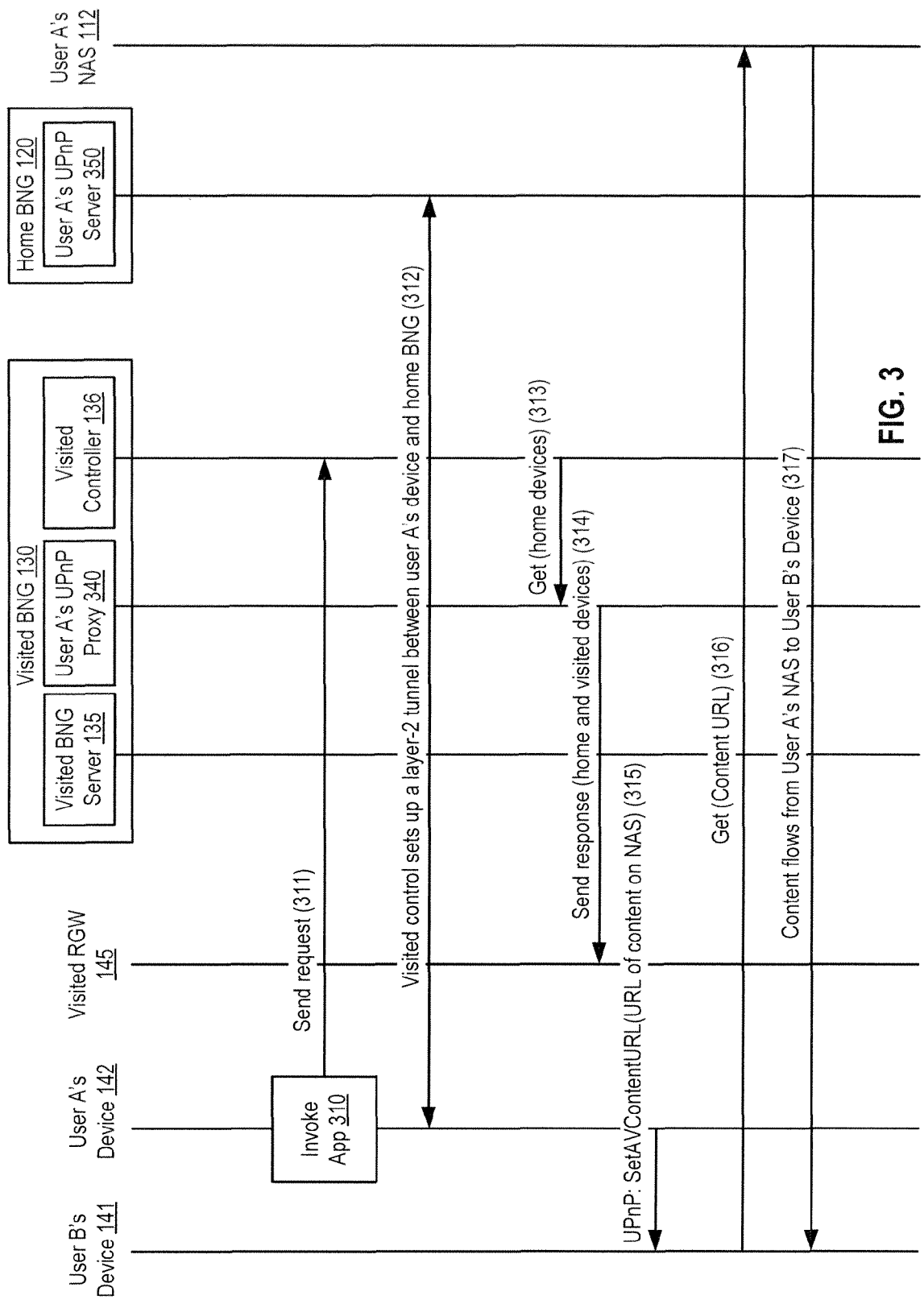
FIG. 3 is a diagram illustrating the message exchanges for content sharing in a visited network according to one embodiment.

FIG. 3 is a diagram illustrating the message exchanges among user B's device 141, user A's device 142, the visited RGW 145, the visited BNG 130, the home BNG 120 and the NAS 112 in the home UPnP network 110, according to one embodiment of the invention. FIG. 3 depicts the connection of the home and visited UPnP networks 110 and 140 to enable media sharing, following the network state instantiation of FIG. 2. The operations shown and described in FIG. 3 can be accomplished in a few quick steps without any user intervention.

According to the example of FIG. 3, when user A invokes (310) the application on her device 142, a request is sent (311) from her device 142 to the visited controller 136. In response to the request, the visited controller 136 sets up network state and sets up (312) a remote UPnP bridge via a layer-2 tunnel between user A's device 142 and the home BNG 120. The setup is enabled by the authentication and authorization of user A, as well as the instantiation of a privileged layer-2 connection between user A's device 142 and the home BNG 120. After user A has been authorized, user A's UPnP proxy 340 in the visited BNG 130 receives (313) a list of home devices that are connected to the home UPnP network 110 from the visited controller 136, and sends (314) this list together with a list of visited devices to user A's device 142. In one embodiment, user B may mark one or more of his devices in the visited UPnP network 140 as accessible by other people. For example, user B may mark his TV as accessible but does not mark his computer. Thus, the list of visited devices sent to user A's device 142 will include the TV but not the computer. To enable user B to selectively make his devices available to others, the visited controller 136 may implement a UPnP access control mechanism, which controls the exposure of user B's devices to user A's UPnP proxy 340.

After user A receives the response, it sends (315) access information to user B's device 141 (e.g., a TV). For example, the access information may be the Uniform Resource Locator (URL) of the content on the NAS 112. After receiving the access information, user B's device 141 sends (316) a request to get the content at the URL location, and the NAS 112 in response sends the requested content to user B's device 141. The content flows through (317) the layer-2 connections 154, 153 and 151, according to the network policy established between user A and user A's network operator.

Figure 4:
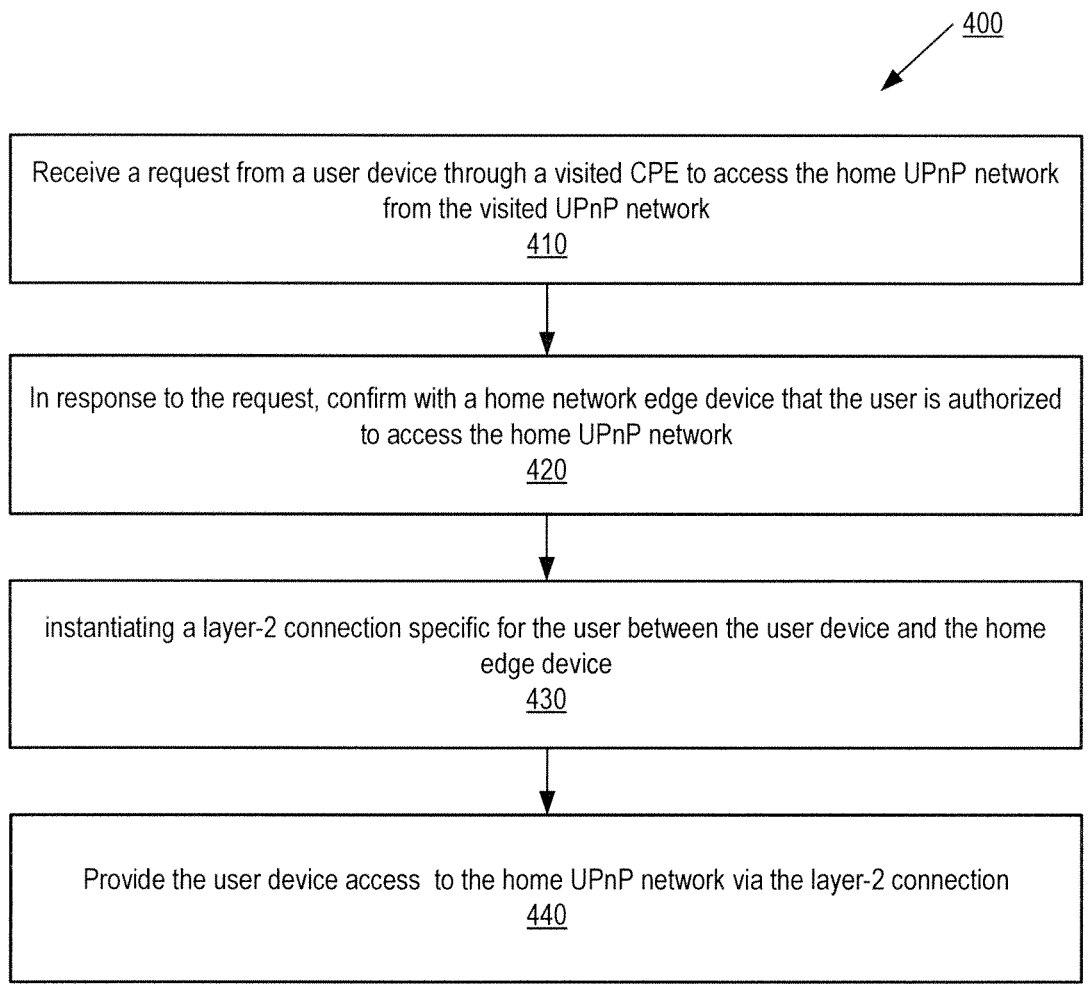
FIG. 4 is flow diagram illustrating a method for instantiating network state for remote access according to one embodiment.

FIG. 4 illustrates a method 400 of a controller device for enabling a user to remotely access a home UPnP network using a user device from a visited UPnP network. The controller device is coupled to a visited network edge device, which is operated by a visited network operator and controls access of the visited UPnP network from and to a WAN. In one embodiment, the method 400 may be performed by the controller 126 or 136 of FIG. 1, which may be implemented by hardware, firmware, software, or a combination thereof. In one embodiment, the method 400 may be performed by a controller device 610 of FIG. 6A.

In one embodiment, the method 400 begins when the controller device receives a request from the user device through a visited CPE to access the home UPnP network from the visited UPnP network (block 410). In response to the request, the controller device confirms with a home network edge device that the user is authorized to access the home UPnP network (block 420). The home network edge device is operated by a home network operator and controls access of the home UPnP network from and to the WAN. The controller device then instantiates a layer-2 connection specific for the user between the user device and the home edge device (block 430), where the layer-2 connection spans from the user device through the visited CPE, the visited network edge device and the wide area network to reach the home network edge device. The controller device provides the user device access to the home UPnP network via the layer-2 connection (block 440).

Figure 5:
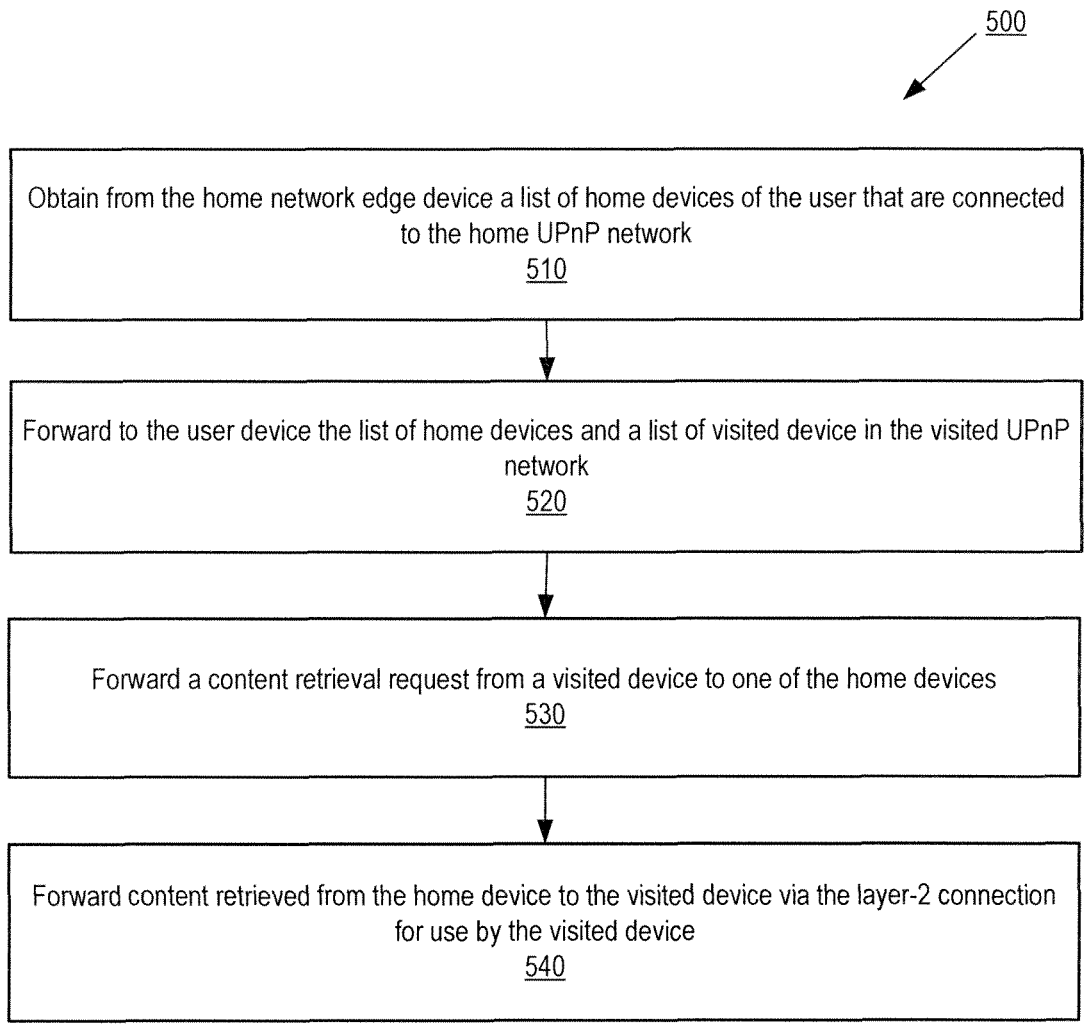
FIG. 5 is flow diagram illustrating a method for content sharing in a visited network according to one embodiment.

FIG. 5 illustrates a method 500 for enabling a roaming user to share home contents with a visited user in the visited UPnP network. In one embodiment, the method 500 may be performed by the controller 126 or 136 of FIG. 1, which may be implemented by hardware, firmware, software, or a combination thereof. In one embodiment, the method 500 may be performed by a controller device 610 of FIG. 6A.

In one embodiment, the method 500 begins when the controller device obtains from the home network edge device a list of home devices of a user (e.g., a roaming user A) that are connected to the home UPnP network (block 510). The controller device forwards to the user device the list of home devices and a list of visited device in the visited UPnP network (block 520). The list of home devices and the list of visited devices are accessible by the user device from the visited UPnP network. The list of visited devices includes a visited device of a second user (e.g., a visited user B). The controller device forwards a content retrieval request from the visited device to one of the home devices in the list of home devices (block 530), and also forwards content retrieved from the home device to the visited device via the layer-2 connection for use by the visited device (block 540).

Figure 6B:
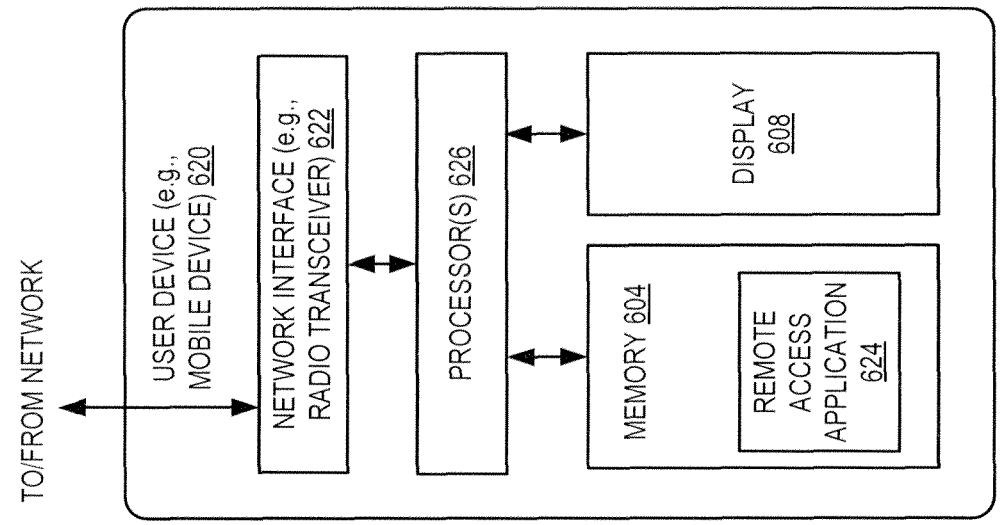
FIG. 6B is a block diagram of a user device according to one embodiment.
Figure 6A:
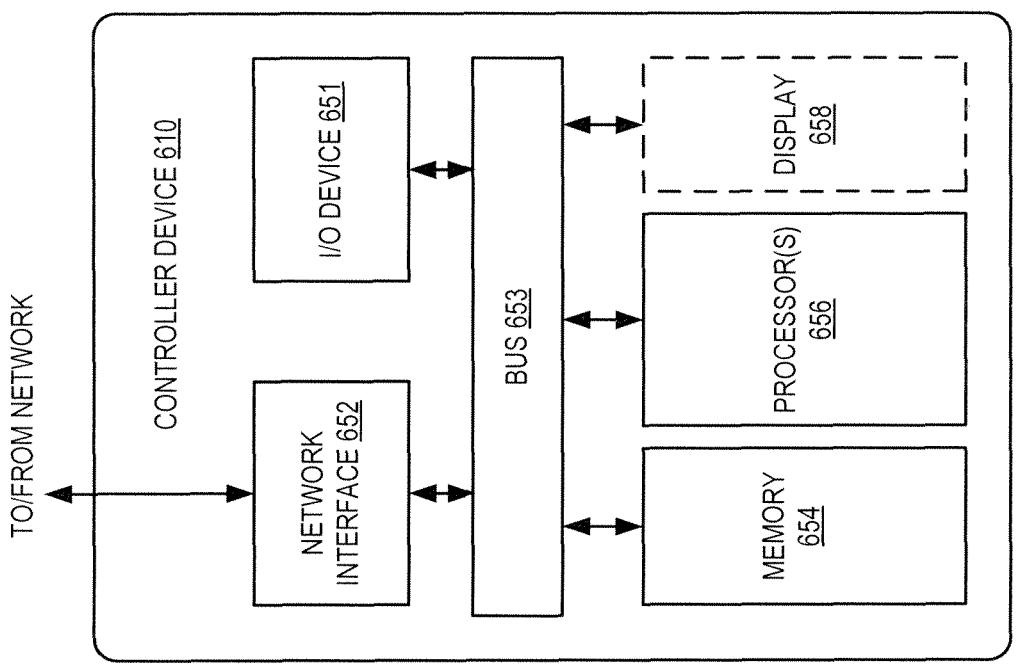
FIG. 6A is a block diagram of a controller device according to one embodiment.

FIG. 6A illustrates an example of a controller device 610 according to one embodiment. To avoid obscuring the embodiment, some components of the controller device 610 are not shown. In this embodiment, the controller device 610 includes one or more processors 656, memory 654, an I/O device 651, a network interface 652 and a bus (or interconnect) 653. The controller device 610 may optionally include a display 258. The memory 654 includes one or more of the following: read-only memory (ROM), flash memory, dynamic random access memory (DRAM), static memory and data storage device. The network interface 652 communicates with an external data network.

FIG. 6B illustrates an example of a user device 620 (e.g., a mobile device) in communication with the controller device 610. The user device 620 may be a cellular phone, a tablet computer, a smart phone, a laptop computer, an electronic reading device, or any portable electronic devices that have wireless communication capabilities. In the embodiment shown, the user device 620 includes a network interface 622 (e.g., a radio transceiver), one or more processors 626, memory 604, and a display 608. In an embodiment where the user device is a wireless mobile device, the network interface 622 may communicate voice and/or data signals with base stations using wireless radio communication protocols. The display 608 provides a graphical user interface (GUI) that displays images and data. The memory 604 includes one or more of the following: read-only memory (ROM), flash memory, dynamic random access memory (DRAM), static memory and data storage device. In an embodiment, the memory 204 stores a remote access application 624, which can be invoked by a user to remotely access the home UPnP network. In an alternative embodiment, the user device 620 may include a set of embedded credentials, such as a SIM card or a software-based SIM.

The operations of the methods of FIGS. 4 and 5 have been described with reference to the exemplary embodiments of FIGS. 1, 6A and 6B. However, it should be understood that the operations of the methods of FIGS. 4 and 5 can be performed by embodiments of the invention other than those discussed with reference to FIGS. 1, 6A and 6B, and the embodiments discussed with reference to FIGS. 1, 6A and 6B can perform operations different from those discussed with reference to the methods of FIGS. 4 and 5. While the methods of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., computers, servers, mobile devices, etc.). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a controller device for enabling a user to remotely access a home Universal Plug-and-Play (UPnP) network using a user device from a visited UPnP network, wherein the controller device is coupled to a visited network edge device that is operated by a visited network operator and controls access of the visited UPnP network from and to a wide area network, the method comprising the steps of:

receiving a request from the user device through a visited customer premise equipment (CPE) to access the home UPnP network from the visited UPnP network;

confirming, in response to the request, with a home network edge device that the user is authorized to access the home UPnP network, wherein the home network edge device is operated by a home network operator and controls access of the home UPnP network from and to the wide area network;

instantiating a layer-2 connection specific for the user between the user device and the home network edge device, wherein the layer-2 connection spans from the user device through the visited CPE, the visited network edge device and the wide area network to reach the home network edge device; and providing the user device access to the home UPnP network via the layer-2 connection.

2. The method of claim 1, providing the user device access further comprises the step of: providing the user device access to the home UPnP network according to a service agreement and service policy established between the user and the home network operator.

3. The method of claim 1, further comprising the steps of:

obtaining from the home network edge device a list of home devices of the user that are connected to the home UPnP network; and forwarding to the user device the list of home devices and a list of visited devices in the visited UPnP network, wherein the list of home devices and the list of visited devices are accessible by the user device from the visited UPnP network.

4. The method of claim 3, wherein the list of visited devices includes a visited device of a second user, and wherein the method further comprises the steps of:

forwarding a content retrieval request from the visited device to one of the home devices in the list of home devices; and forwarding content retrieved from the one home device to the visited device via the layer-2 connection for use by the visited device.

5. The method of claim 1, wherein the request from the user device includes an identifier of the user and an identifier of the home network edge device.

6. The method of claim 1, wherein the user device is assigned a first Internet Protocol (IP) address by the visited network edge device from an address range of the visited network operator, and is assigned a second IP address by the home network edge device from an address range of the home UPnP network.

7. The method of claim 1, further comprising the steps of:
configuring firewall ports in the visited network edge device for the user device; and
instantiating a UPnP proxy for the user device.

8. The method of claim 1, wherein the step of instantiating a layer-2 connection further comprises the step of: instantiating a unique layer-2 tunnel specific for the user between the visited CPE and the visited network edge device.

9. The method of claim 1, wherein the user device is a mobile device that connects to the visited CPE via wireless communication.

10. The method of claim 1, wherein each of the home network edge device and the visited network edge device is a broadband network gateway (BNG).

11. A network device functioning as a controller device that enables a user to remotely access a home Universal Plug-and-Play (UPnP) network using a user device from a visited UPnP network, wherein the controller device is coupled to a visited network edge device that is operated by a visited network operator and controls access to a wide area network from the visited UPnP network, the network device comprising:
one or more processors; and
a network interface coupled to the one or more processors, the network interface adapted to receive a request from the user device through a visited customer premise equipment (CPE) to access the home UPnP network from the visited UPnP network,
wherein the one or more processors are adapted to:
confirm, in response to the request, with a home network edge device that the user is authorized to access the home UPnP network, wherein the home network edge device is operated by a home network operator and controls access of the home UPnP network from and to the wide area network;
instantiate a layer-2 connection specific for the user between the user device and the home network edge device, wherein the layer-2 connection spans from the user device through the visited CPE, the visited network edge device and the wide area network to reach the home network edge device; and
provide the user device access to the home UPnP network via the layer-2 connection.

12. The network device of claim 11, wherein the user device access to the home UPnP network is provided according to a service agreement and service policy established between the user and the home network operator.

13. The network device of claim 11, wherein the one or more processors are further adapted to:
obtain from the home network edge device a list of home devices of the user that are connected to the home UPnP network; and
forward to the user device the list of home devices and a list of visited device in the visited UPnP network, wherein the list of home devices and the list of visited devices are accessible by the user device from the visited UPnP network.

14. The network device of claim 13, wherein the list of visited devices includes a visited device of a second user, and wherein the one or more processors are further adapted to:
forward a content retrieval request from the visited device to one of the home devices in the list of home devices; and
forward content retrieved from the one home device to the visited device via the layer-2 connection for use by the visited device.

15. The network device of claim 11, wherein the request from the user device includes an identifier of the user and an identifier of the home network edge device.

16. The network device of claim 11, wherein the user device is assigned a first Internet Protocol (IP) address by the visited network edge device from an address range of the visited network operator, and is assigned a second IP address by the home network edge device from an address range of the home network.

17. The network device of claim 11, wherein the one or more processors are further adapted to configure firewall ports in the visited network edge device for the user device, and instantiate a UPnP proxy for the user device.

18. The network device of claim 11, wherein the one or more processors are further adapted to instantiate a unique layer-2 tunnel specific for the user between the visited CPE and the visited network edge device.

19. The network device of claim 11, wherein the user device is a mobile device that connects to the visited CPE via wireless communication.

20. The network device of claim 11, wherein each of the home network edge device and the visited network edge device is a broadband network gateway (BNG).

21. A method performed by a controller device for enabling a user to remotely access a home Universal Plug-and-Play (UPnP) network using a mobile device from a visited UPnP network, wherein the controller device is coupled to a visited Broadband Network Gateway (BNG) that is operated by a visited network operator and controls access of the visited UPnP network from and to a wide area network, the method comprising the steps of:
receiving a request from the mobile device through a visited residential gateway to access the home UPnP network from the visited UPnP network;
confirming, in response to the request, with a home BNG that the user is authorized to access the home UPnP network, wherein the home BNG is operated by a home network operator and controls access of the home UPnP network from and to the wide area network;
instantiating a layer-2 connection specific for the user between the mobile device and the home BNG, wherein the layer-2 connection spans from the mobile device through the visited residential gateway, the visited BNG and the wide area network to reach the home BNG; and
providing the user device access to the home UPnP network via the layer-2 connection.

* * * * *